(No Model.) 2 Sheets—Sheet 1.

J. R. McCRERY, Jr.,
For himself and as administrator of T. G. McCRERY, deceased.
TELLURIAN.

No. 264,548. Patented Sept. 19, 1882.

WITNESSES:
F. McArdle
C. Sedgwick

INVENTOR:
J. R. McCrery Jr. for himself &
Administrator of the Estate of
T. G. McCrery deceased
BY
Munn & Co
ATTORNEYS.

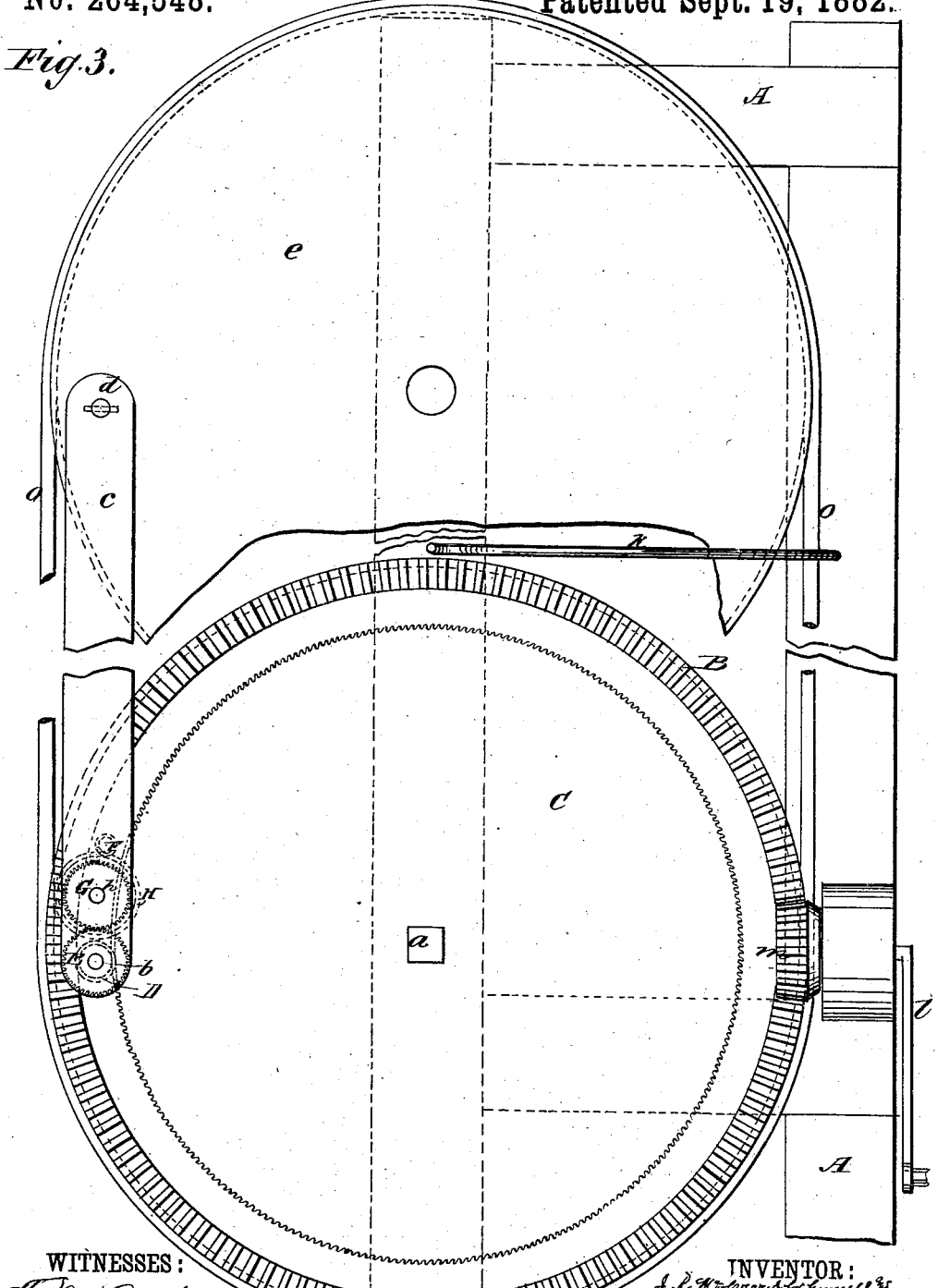

UNITED STATES PATENT OFFICE.

JOHN R. McCRERY, JR., OF SULPHUR LICK, KENTUCKY, FOR HIMSELF AND AS ADMINISTRATOR OF THOMAS G. McCRERY, DECEASED.

TELLURIAN.

SPECIFICATION forming part of Letters Patent No. 264,548, dated September 19, 1882.

Application filed May 11, 1882. (No model.)

*To all whom it may concern:*

Be it known that I, JOHN R. McCRERY, Jr., of Sulphur Lick, in the county of Monroe and State of Kentucky, together with THOMAS G. McCRERY, late a citizen of Monroe county, State of Kentucky, but now deceased, did invent a new and useful Improvement in Tellurians, of which the following is a full, clear, and exact description.

The object the invention is to construct a simple and inexpensive apparatus for illustrating the rotation of the earth on its axis and around the sun, the changes of day and night and the seasons, and other phenomena connected with the movement of the earth in its path through the heavens, in a manner that can be clearly understood by youngest pupils.

The invention consists in the mechanism hereinafter described and claimed.

Reference is to be had to the accompanying drawings, forming a part of this specification, in which similar letters of reference indicate corresponding parts in all the figures.

Figure 1:
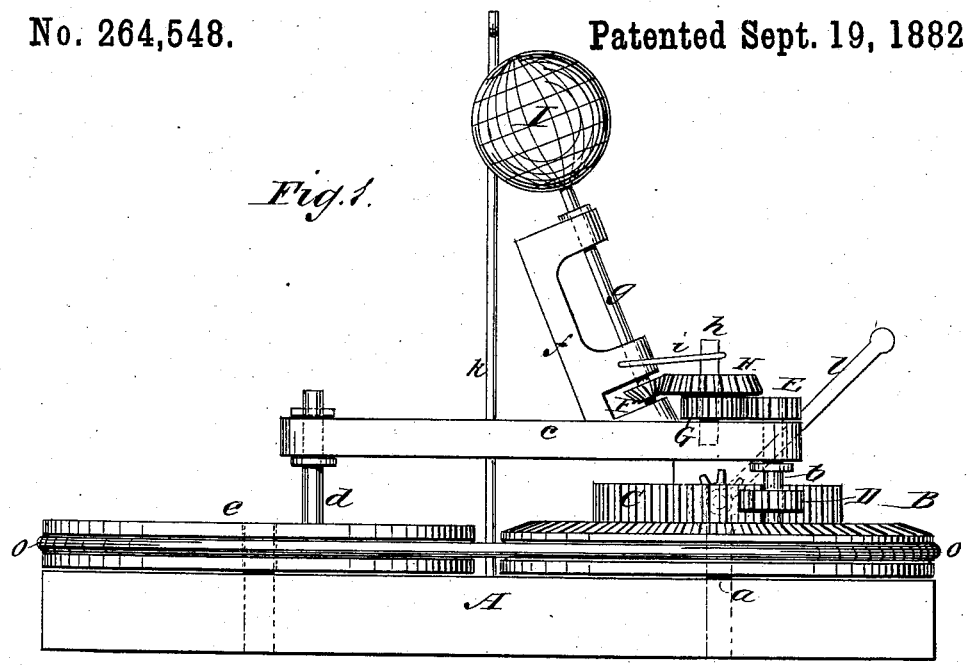
Figure 2:
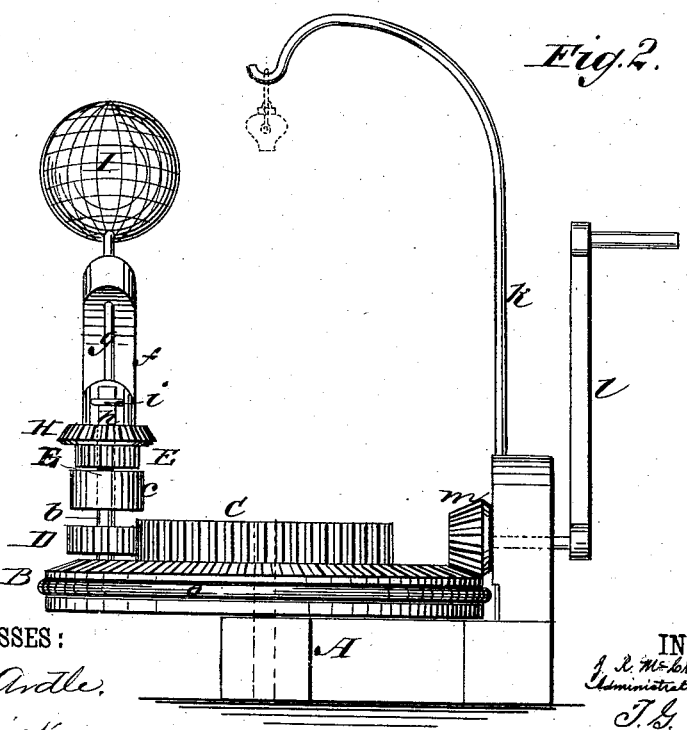

Figure 1 is a side elevation of the apparatus. Fig. 2 is an end elevation, and Fig. 3 is a plan view.

A is the face of the apparatus, which may be of any suitable construction.

B is the primary wheel, fitted horizontally to revolve on a stud, *a*, on the base, and formed with cogs on its outer edge.

C is a smaller fixed gear-wheel on stud *a*, above wheel B.

*b* is a short arbor, stepped on wheel B, and carrying a pinion, D, that engages the fixed gear C, and also carrying on its upper end a pinion, E.

*c* is a bar connecting the arbor *b* to a post, *d*, that is on a wheel, *e*, fitted on base A, in the plane of wheel B, the bar being loose on both the arbor *b* and post *d*. On bar *c* is fixed a standard, *f*, that carries a shaft, *g*, inclined twenty-three and one-half degrees (more or less) to the vertical, and on the lower end of the shaft is a bevel-gear wheel, F. On bar *c* is also an intermediate arbor, *h*, which carries a square pinion, G, and bevel-pinion H, which are connected together and engage the wheels E F, respectively. The arbor *h* is braced by a yoke, *i*, from standard *f*. On the upper end of shaft *g* is a globe, I, properly marked to represent the earth.

The base A is provided with a rod or post, *k*, the upper end of which is bent inward, and terminates at a point which is the center of rotation of globe G around the wheel C, and the end of the rod has a hook or is otherwise arranged to hold a light.

For operating the mechanism I have shown a crane, *l*, sustained in suitable bearings on base A, and carrying a pinion, *m*, engaging the cogged rim of the wheel B, so as to rotate the same. A pendulum and weight or spring may be used when a slow operation is preferred. The pendulum will be attached directly to a verge-wheel on shaft *l*, so as to give a slow and regular motion, which can be varied by adjustment of the pendulum-ball.

The fixed wheel C has three hundred and sixty-five cogs; pinion D, ten cogs. Pinions E G are alike in respect to their number of cogs, while the bevel-gear H, which is connected to pinions G, has ten times the number of cogs on bevel-gear F that is on the globe-shaft. With this arrangement, as the pinion D is carried around the fixed gear C by the revolution of wheels B, the bar *c* carries the globe around the light suspended on rod *k*, and the globe in traveling once around the light is turned with shaft *g* three hundred and sixty-five times. The wheel B is connected to wheel *e* by a belt, *o*, and the bar *c*, being also connected to wheel *e*, the shaft *g* is retained inclined in the one direction at all times. By this movement of the globe around the light the phenomena of day and night, the changes of seasons, and the duration of day-light at particular locations are shown in a manner to be easily understood.

Having thus described the invention, I claim as new and desire to secure by Letters Patent—

1. In tellurians, the combination of wheel B, fixed gear C, arbor *b*, pinions D E, bar *c*, shaft *g*, pinion F, and intermediate gearing G H, substantially as shown and described, for operating as specified.

2. In tellurians, the combination of wheels B *e*, provided with arbor *b* and post *d*, the belt *o*, and the bar *c*, carrying the globe-shaft and gearing, substantially as shown and described.

JOHN R. McCRERY, JR.
JOHN R. McCRERY, JR.,
*Administrator.*

Witnesses:
N. M. BOWLS,
RACHEL S. BOWLS.